US008068731B2

(12) United States Patent
Peng et al.

(10) Patent No.: US 8,068,731 B2
(45) Date of Patent: Nov. 29, 2011

(54) DYNAMIC BANDWIDTH ALLOCATION METHOD OF ETHERNET PASSIVE OPTICAL NETWORK

(75) Inventors: Jan-Wen Peng, Banciao (TW); Hsing-Yi Wu, Xizhi (TW); Chung-Ju Chang, Taipei (TW)

(73) Assignee: Chunghwa Telecom Co., Ltd., Taoyuan County (TW)

( * ) Notice: Subject to any disclaimer, the term of this patent is extended or adjusted under 35 U.S.C. 154(b) by 477 days.

(21) Appl. No.: 12/419,748

(22) Filed: Apr. 7, 2009

(65) Prior Publication Data

US 2010/0254707 A1    Oct. 7, 2010

(51) Int. Cl.
  *H04B 10/20*    (2006.01)
  *H04J 3/16*    (2006.01)
(52) U.S. Cl. ............... 398/58; 398/63; 398/66; 398/67; 398/98; 398/100; 398/101; 370/468; 370/395.21; 370/395.4; 370/395.41; 370/395.42
(58) Field of Classification Search .................. None
See application file for complete search history.

(56) References Cited

U.S. PATENT DOCUMENTS 7,843,965 B2 * 11/2010 Lai et al. ................ 370/468
2006/0280502 A1 * 12/2006 Sekine et al. ............. 398/71

OTHER PUBLICATIONS

Song et al: Priority-based dynamic bandwidth allocation in Ethernet Passive Optical Networks, Photonic Network Communications, vol. 15, No. 3, 2008, pp. 203-212.*

G. Kramer, et al., Ethernet PON(EPON):design and analysis of an optical access network, Phontic Network Communications vol. 3, No. 3, p. 307-319, Jul. 2001.
G. Kramer, et al., IPACT:A dynamic protocol for an Ethernet PON(EPON), IEEE Communications Magazine vol. 40, No. 2, p. 74-80, Feb. 2002.
H. Cheng, M. Chen, and S. Xie, A dynamic bandwidth allocation scheme supporting different priority services in EPON, Proceedings of SPIE vol. 5626, p. 1123-1127, 2005.
C. M. Assi, Y. Ye, S. Dixit, and M. A. Ali, Dynamic bandwidth allocation for quality-of-service over ethernet PONs, IEEE JSAC. vol. 21, p. 1467-1477, Nov. 2003.
J. Xie, S. Jiang, and Y. Jiang, A dynamic bandwidth allocation scheme for differented services in EPONs, IEEE Opt. Communications vol. 42, p. 32-39, Aug. 2004.
Y. Yang, J.Nho, and B. Ahn, An enhanced burst-polling based delta dynamic bandwidth allocation scheme for QoS over E-PONs, NRBC'04 vol. 89, p. 31-36, Oct. 2004.
Y. Luo and N. Ansari, Bandwidth allocation for multiservice access on EPONs, IEEE Opt. Communications vol. 43, p. 16-21, Feb. 2005.
S. Haykin and L. Li, Nonlinear adaptive prediction of nonstationary signals, IEEE Trans. Signal Processing vol. 43, p. 526-535, 1995.
J. Baltersee and J. A. Chambers, Nonlinear adaptive prediction of speech using a pipelined recurrent neural network, IEEE Trans. Signal Processing vol. 46, No. 8, p. 2207-2216.

* cited by examiner

*Primary Examiner* — Li Liu
(74) *Attorney, Agent, or Firm* — Ming Chow; Sinorica, LLC

(57) ABSTRACT

A dynamic bandwidth allocation method of an Ethernet passive optical network, comprises a predictor and a rule of QoS-promoted dynamic bandwidth allocation (PQ-DBA); the predictor predicts a client behavior and numbers of various kinds of packets by using a pipeline scheduling predictor consisted of a pipelined recurrent neural network (PRNN), and a learning rule of the extended recursive least squares (ERLS); the present invention establishes a better QoS traffic management for the OLT-allocated ONU bandwidth and client packets sent by priority.

17 Claims, 5 Drawing Sheets

DYNAMIC BANDWIDTH ALLOCATION METHOD OF ETHERNET PASSIVE OPTICAL NETWORK

BACKGROUND OF THE INVENTION

1. Field of the invention

The present invention relates to a dynamic bandwidth allocation (DBA) method of an Ethernet passive optical network (EPON), and more particularly, to a DBA method which is based on a pipeline scheduling predictor consisted of a pipelined recurrent neural network (PRNN) and a learning rule of the extended recursive least squares (ERLS) to predict a client behavior and numbers of various kinds of packets for new arriving packets of each optical network unit (ONU) in a cycle time to provide a reference for a optical line terminal (OLT) in granting bandwidth allocation, thereby increasing the transmission performance between the OLT and the ONU while reducing a packet loss rate of the ONU.

2. Description of the Prior Art

There have been studies of the scheduling of uplink signals in an Ethernet passive optical network (EPON). Since the uplink bandwidth of EPON is shared between ONUs, it is vital to allocate the uplink bandwidth for ONUs. The earliest proposition for uplink signals scheduling is Time Division Multiple Access (TDMA), as recited in reference [1], wherein each ONU is allocated a fixed timeslot. Although TDMA is easy to implement in EPON, it can't handle the varying data packet demands of ONUs and has a low bandwidth utilization rate. Therefore, Kramer (reference[2]) proposed a method of Interleaved Polling with Adaptive Cycle Time (IPACT) to deal with the burst traffic of data communication to improve the dynamic bandwidth allocation of ONU, this method is also proposed to the IEEE 802.3ah committee as a standard proposition for the MultiPoint Control Protocol (MPCP) of the Ethernet passive optical network. However, the IPACT does not take the issues of delay and drop probability into consideration as to the QoS demands of services provided by ONUs;

According to the rule of IPACT, packets from the ONU are processed in a First Come First Serve (FCFS) manner, so each packet would have a fixed delay time, which is not acceptable for voice or real-time video traffic since it could cause higher jitter. Many studies have been proposed to improve QoS, such as the DBA-High Priority cited in reference [3], which reduces the delay time and the jitter of high-priority services but also increases the drop probability and the delay time of low-priority services and thus results in lower throughput for low-priority services. Furthermore, an intra-ONU, inter-ONU, two layer bandwidth allocation (TLBA) method has proposed to increase the cycle time of each ONU to solve the unfairness in dealing with high- and low-priority services as recited in reference [3]; however, it increases the delay time and reduces the throughput of high-priority services and fails to meet the demands of burst traffic.

The burst-polling based delta DBA method (reference[6]) and the DBA with multiple service (DBAM) method (reference[7]) are proposed to improve the average delay time by predicting the arriving packets, however, the maximum window mechanism proposed in both references is designed to let the OLT give more bandwidth than that required by the ONU and tends to waste valuable bandwidth and reduces transmission performance.

Therefore, the traditional DBA methods still present some shortcomings to be overcome.

In view of the above-described deficiencies of the TDMA-based or the IPACT-based dynamic bandwidth allocation method, after years of constant efforts in research, the inventor of this invention has consequently developed and proposed a dynamic bandwidth allocation method of an Ethernet passive optical network, which is based on a pipeline scheduling predictor consisted of a pipelined recurrent neural network (reference[8]) and a learning rule (reference[9]) of the extended recursive least squares (ERLS) in the present invention.

SUMMARY OF THE INVENTION

It is an object of the present invention to provide a dynamic bandwidth allocation method of an Ethernet passive optical network, wherein the method predicts a client behavior and numbers of various kinds of packets by using a pipeline scheduling predictor consisted of a pipelined recurrent neural network (PRNN), and a learning rule of the extended recursive least squares (ERLS), since the PRNN predictor is advantageous in providing fast convergence and accurate prediction, it is suitable for making prediction of the Ethernet passive optical network, wherein each ONU uses a pig-tail mechanism for late-reported traffic type. Therefore, the predictor improves the bandwidth utilization rate of the Ethernet passive optical network.

It is another object of the present invention to provide a dynamic bandwidth allocation method of an Ethernet passive optical network, wherein the method proposes a rule of QoS-promoted Dynamic Bandwidth Allocation (PQ-DBA) to improve the uplink/downlink algorithm of the Interleaved Polling with Adaptive Cycle Time (IPACT) for the Ethernet passive optical network, as defined in IEEE 802.3ah, and to overcome the deficiencies of other DBA methods in terms of QoS and client behavior predictions to maximize the bandwidth utilization. Besides, the PQ-DBA method can also improves the average data delay time and fairness for priority-based packets.

In order to achieve the above objects, the dynamic bandwidth allocation method of an Ethernet passive optical network assumes that in an Ethernet passive optical network (please refer to FIG. 1 for the system structure of the Ethernet passive optical network), the downlink rate is $R_E$(bps), the transmission rate between a client to each optical network unit (ONU) is $R_U$(bps); and an optical line terminal (OLT) is connected to a 1:M splitter, which connects to M ONUs, numbered from $ONU_1$ to $ONU_M$, the OLT broadcasts downlink packets to the ONUs for each ONU to receive its own packet according to a Logic Link Identifier (LLID) and to drop packets not belonging to it. The OLT uses MultiPoint Control Protocol (MPCP) to send a GRANT MPCPDU to the ONUs for each ONU to transmit its uplink data packets according to the given bandwidth and the start/end time of optical signals defined by the GRANT MPCPDU.

Each ONU adds a REPORT MPCPDU in the last column of its uplink data packet to inform the OLT and tells the OLT the number of unsent packets in the ONU so as to request for the given bandwidth in the next GRANT MPCPDU.

The $ONU_i$ receives three kinds of service packets (voice, video and data) from the client and stores them in three queues (marked as $Q_{0,i}, Q_{1,i}, Q_{2,i}, 1 \leq i \leq M$) respectively, the values of packets stored in the queue are recorded in $L_{0,i}, L_{1,i}, L_{2,i}, 1 \leq i \leq M$, respectively;

Besides, the present invention proposes three additional sets of QoS factors:

(1) video packet delay threshold ($T_d^*$)
(2) video packet drop probability threshold ($P_d^*$); and
(3) data packet waiting time threshold ($T_w^*$), all the factors are recorded in the queue $Q_{0,i}, Q_{1,i}, Q_{2,i}, 1 \leq i \leq M$, also the number of packets to be transmitted in the next cycle time will be calculated and recorded in $L_{dp,i}, L_{d,i}, L_{w,i}, 1 \leq i \leq M$;

Furthermore, the OLT uses six packet values ($L_{0,i}, L_{dp,i}, L_{d,i}, L_{w,i}, L_{1,i}, L_{2,i}$) of the REPORT MPCPDU sent by each ONU and calculates with the reference value provided by the PRNN predictor, then uses the PQ-DBA method to distribute an affordable number of packets to each $ONU_i$; a packet controller of the ONU relays the packets from the clients to corresponding queues and drops packets exceeding the queue storage limit; however, in the present invention, the PQ-DBA method also determines to drop a packet which is over the packet delay threshold ($T_d^*$), that is, the packet is not transmitted within $T_d^*$ time.

A queue manager of the ONU controls the packet transmission between the OLT and the ONU(s) and is responsible for transmitting the REPORT MPCPDU messages and a queue status of each ONU, the queue status of each ONU is to show and inform the OLT its remaining packet storage size for various services (measured in byte). Besides, using either TDMA and IPACT could result in the following scenario: when an ONU has sent out all its packets at a certain point of time, the ONU responds to the OLT with REPORT MPCPDU=0, so for the next cycle time, the ONU gets no available bandwidth (the OLT will set Grant=0 for the given bandwidth); later, assuming the ONU has new packets to send, but at this time there's no available bandwidth for the ONU (because queue packet value=0 in the previous REPORT MPCPDU), the ONU must request bandwidth from the OLT once again and waits for at least two or three cycle time to transmit client's data packets.

It will take two to three cycle times for the OLT and the ONU uses GRANT and REPORT MPCPDU to communicate with each other, while during the cycle times the client of the ONU could be still transmitting data. Therefore, the present invention uses the PRNN predictor to estimate transmission rates of various kinds of packets of the ONU for each cycle time, and to multiply the transmission rates with the cycle time to estimate a number of new packets for each service (recorded in $L_{0,i}, L_{1,i}, L_{2,i}, L_{dp,i}, L_{d,i}, L_{w,i}$) as a reference for the OLT in distributing the bandwidth for each ONU, thereby improving the utilization rate of the Ethernet passive optical network.

Finally the OLT will sequentially estimates a new transmission rate and a number of new packets for each $ONU_i$ in each cycle time, and distributes a bandwidth for each $ONU_i$ according to the PQ-DBA method.

DETAILED DESCRIPTION OF THE PREFERRED EMBODIMENT

Figure 1:
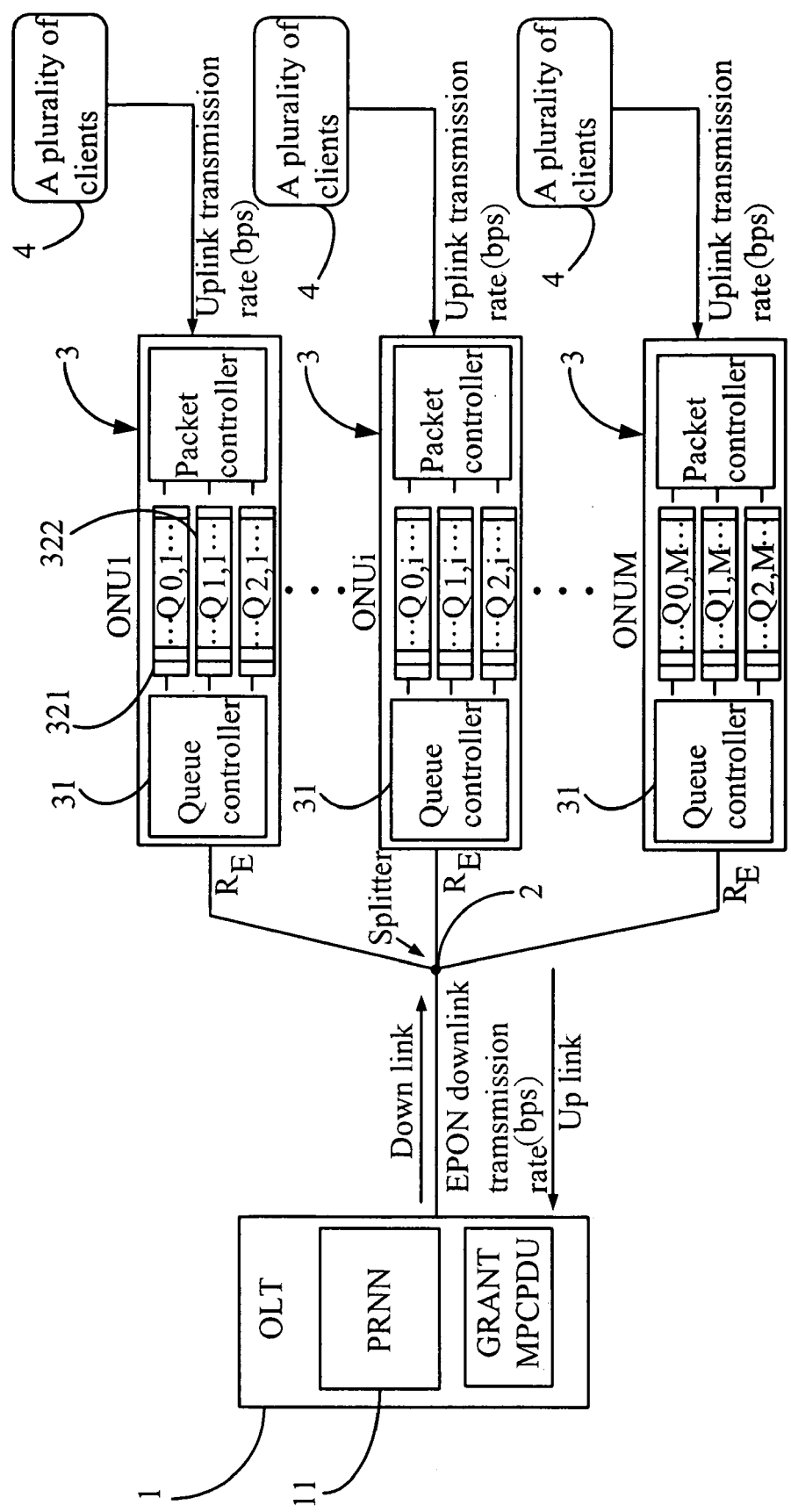
FIG. 1 illustrates a system structure of an Ethernet passive optical network using a dynamic bandwidth allocation method.

Please refer to FIG. 1 for a system structure of an Ethernet passive optical network using a dynamic bandwidth allocation method, which comprises:

a optical line terminal (OLT) 1 coupling with a splitter 2 for broadcasting downlink packets to a plurality of optical network units (ONU) 3, the OLT 1 further comprising a pipelined recurrent neural network (PRNN) 11 for distributing a GRANT MultiPoint Control Protocol Data Unit (MPCPDU);

the splitter 2 coupling with the OLT 1 and the plurality of ONUs 3, wherein the splitter 2 is a one-to-multiple-point splitter;

the plurality of ONUs 3 coupling with the splitter 2 and a plurality of clients 4, each ONU receiving its own packets according to a Logic Link Identifier (LLD) and dropping packets not matching with its LLD; each ONU comprising a queue controller 31, a voice packet queue 321, a video packet queue 322, a data packet queue 323 and a packet controller 33. Besides, the plurality of ONUs 3 would add a REPORT MPCPDU in the last column of its uplink data packet to inform the OLT 1 and tells the OLT 1 the number of unsent packets in the ONU 3 so as to request for the given bandwidth in the next GRANT MPCPDU;

the plurality of clients 4 coupling with the plurality of ONUs 3, since the OLT 1 and the plurality of ONUs 3 communicate with each other by using GRANT and REPORT MPCPDUs, there could be a two-to-three-cycle-time delay during which the plurality of clients 4 is still transmitting data;

The OLT 1 in the present invention comprises a pipeline scheduling predictor consisted of a pipelined recurrent neural network (PRNN) and a rule of QoS-promoted dynamic bandwidth allocation (PQ-DBA) method, therefore it is suitable for handling signals having high complexity and requiring short convergence time and nonlinear/non-stationary prediction. When it is required to predict the new packet transmission rate $\tilde{\lambda}_{m,i}(n+1)$ of (N+1)th cycle time of the $ONU_i$, then it can be obtained by using the previous p packet transmission rate of the ONU, namely $\lambda_{m,i}(n), \lambda_{m,i}(n-1), \ldots, \lambda_{m,i}(n-p+1)$ as the reference input to calculate the estimate value of $\tilde{\lambda}_{m,i}(n+1)$. Therefore, the present invention uses the PRNN predictor to estimate transmission rates of various kinds of packets of the ONU 3 for each cycle time, and to multiply the transmission rates with the cycle time to estimate a number of new packets for each service (recorded in $L_{0,i}, L_{1,i}, L_{2,i}, L_{dp,i}, L_{d,i}, L_{w,i}$) as a reference for the OLT 1 in distributing the bandwidth for each ONU 3, thereby improving the utilization rate of the Ethernet passive optical network.

Figure 2:
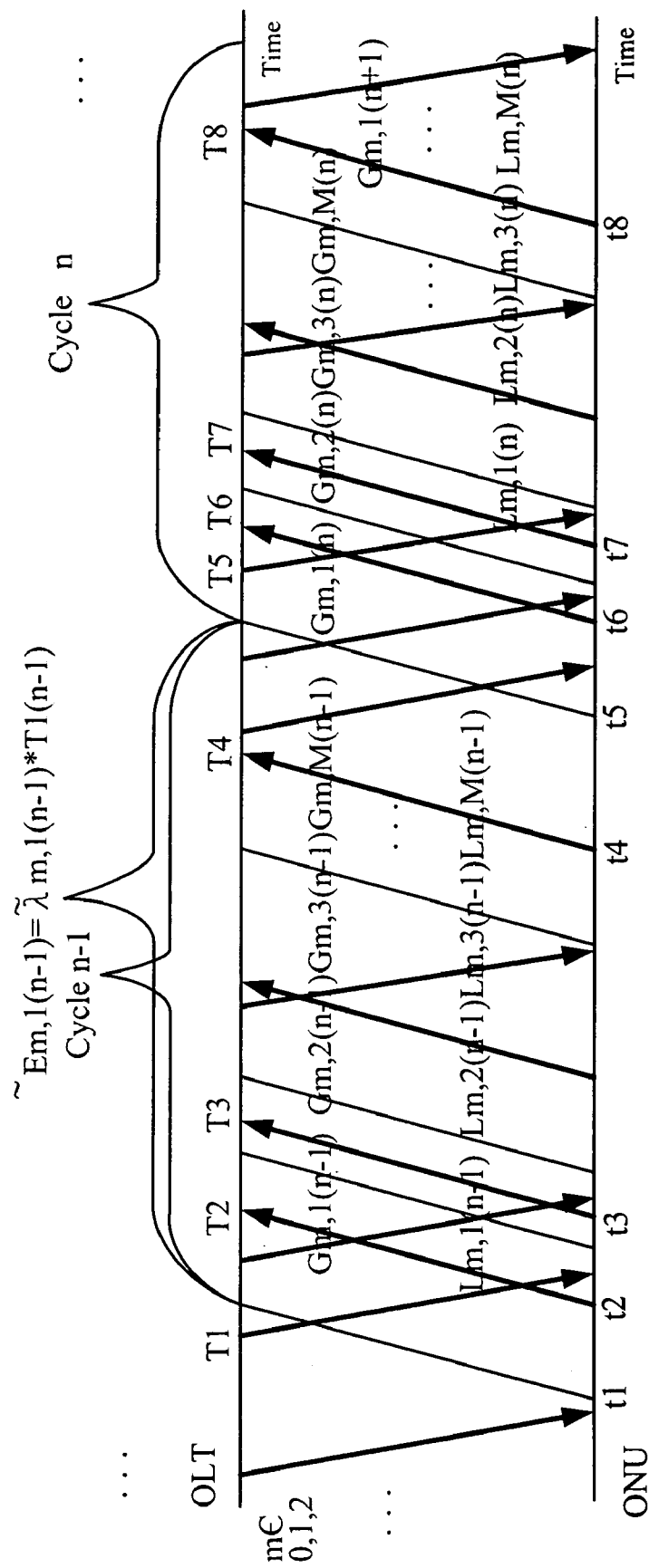
FIG. 2 illustrates a uplink/downlink communication view of an optical line terminal and an optical network unit in the Ethernet passive optical network using the dynamic bandwidth allocation method.

Please refer to FIG. 2 for a uplink/downlink communication view of the OLT 1 and the ONU 3 in the Ethernet passive optical network using the dynamic bandwidth allocation method. The way the OLT and the ONU communicates is that, when the OLT 1 is at the (n−1)th cycle time ($T_i(n-1)$), starting from T1 in FIG. 2, the OLT 1 has received all the queue information from the $ONU_i(L_{m,i}(n-1)$, wherein m={0, 1,2}, $1 \leq i \leq M$, and $L_{dp,i}(n-1), L_{d,i}(n-1)$, and $L_{w,i}(n-1)$), and the OLT 1 uses the PRNN predictor to estimate the number of new packets from $ONU_i$ at $T_i(n-1)$ time, as a reference for the PQ-DBA method in distributing a bandwidth ($G_{m,i}(n)$) for the $ONU_i$; and the OLT 1 calculates the number of new packets in $Q_{m,i}$ of the $ONU_i$ at the (n−1)th cycle time as:

1. High Loading: when $L_{m,i}(n-1)>0$, which means the predicted value is smaller than the real number $A_{m,i}(n-1)$ of incoming packets, or the maximum given bandwidth is less than required bandwidth from $L_{m,i}(n-2)$ of $ONU_i$, then the number of new packets of queue $Q_{m,i}$ in $T_i(n-1)$ time would be:

$$\tilde{E}_{m,i}(n-1) = G_{m,i}(n-1) - L_{m,i}(n-2) + L_{m,i}(n-1) \sim A_{m,i}(n-1) = \lambda_{m,i}(n-1) * T_i(n-1)$$

2. Low Loading: when $L_{m,i}(n-1)=0$, which means the predicted value could be higher that the real number $A_{m,i}(n-1)$ of incoming packets, now the number of new packets is unknown, so it is chosen to be the average of previous numbers of incoming packets:

$$\tilde{E}_{m,i}(n-1) = \frac{\tilde{E}_{m,i}(n-2) + \sum_{k=3}^{n-1} A_{m,i}(n-k)}{n-2} \sim A_{m,i}(n-1) = \lambda_{m,i}(n-1) * T_i(n-1)$$

Where $\lambda_{m,i}(n-1) = A_{m,i}(n-1)/T_i(n-1)$.

3. The number of packets in the (n-1) cycle time is $\tilde{E}_{m,i}(n-1) = \tilde{\lambda}_{m,i}(n-1)*T_i(n-1)$, from FIG. 2, $G_{m,i}(n) = [L_{m,i}(n-1) + \tilde{E}_{m,i}(n-1)] \cong [L_{m,i}(n-1) + A_{m,i}(n-1)]$.

In order to minimize $L_{m,i}(n)$ (maximizing the bandwidth utilization), the bandwidth $G_{m,i}(n)$ distributed by the OLT 1 not only should meet the demands of $L_{m,i}(n-1)$ packets in $Q_{m,i}$, but also should meet the demands of $(A_{m,i}(n-1))$ packets added in $T_i(n-1)$ time; when the prediction is closer to reality, the $L_{m,i}(n)$ is less, however, the value of $L_{m,i}(n)$ is unknown at this time, we can only use the information obtained before the (n-1)th cycle time, such as $\lambda_{m,i}(n-2)$, $\lambda_{m,i}(n-3)$, $\lambda_{m,i}(n-4)$ ... to predict the new packet transmission rate $\tilde{\lambda}_{m,i}(n-1)$ in the (n-1)th cycle time $T_i(n-1)$.

Figure 3:
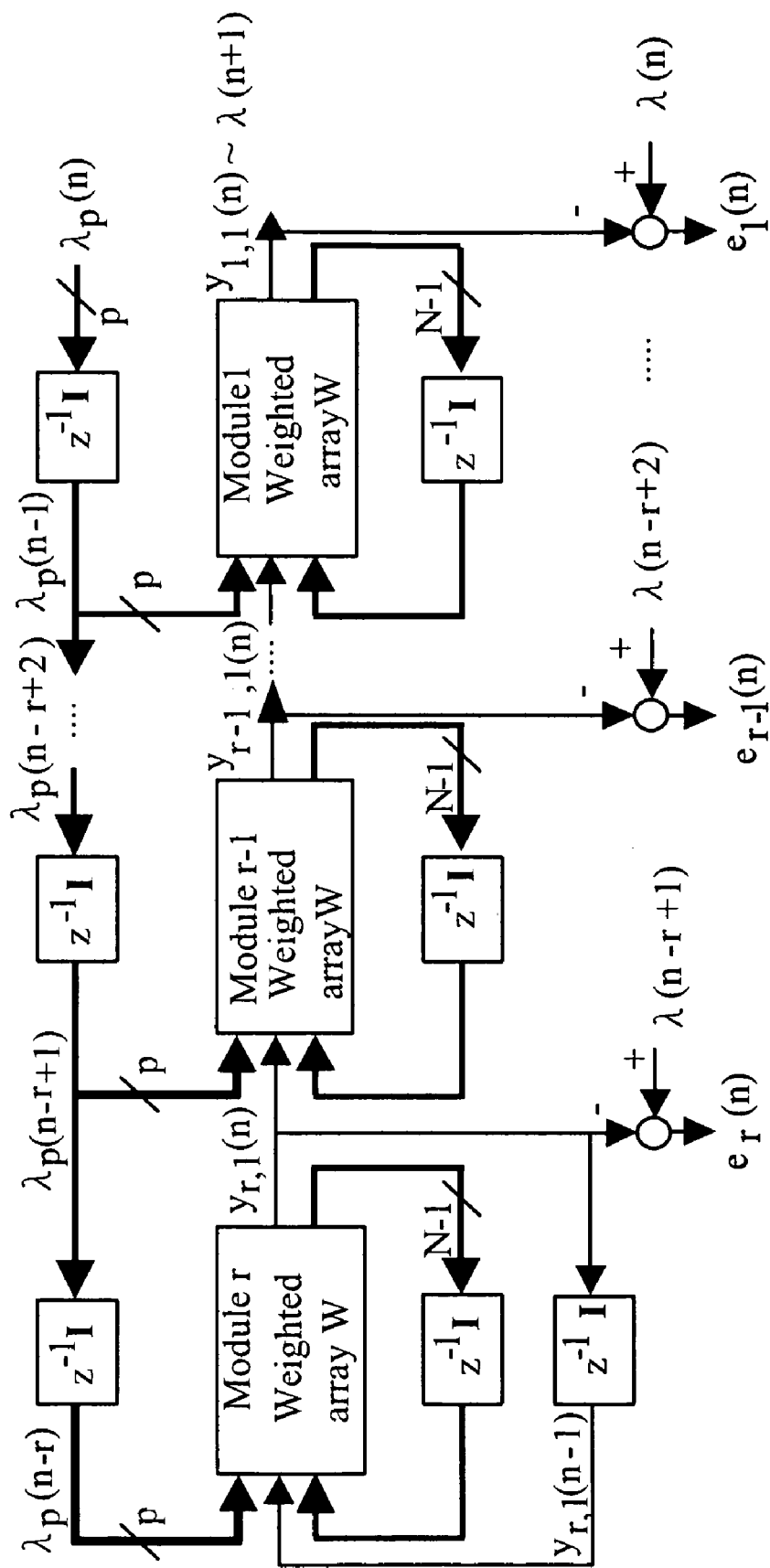
FIG. 3 illustrates a structure of a pipelined recurrent neural network predictor of the Ethernet passive optical network using the dynamic bandwidth allocation method.

Please refer to FIG. 3 for a structure of the PRNN predictor of the Ethernet passive optical network using the dynamic bandwidth allocation method. The structure of the PRNN predictor is based on a nonlinear autoregressive-moving average (NARMA) model, which comprises r hierarchies, each hierarchy comprises a recurrent neural network module (RNN) module and a comparator; wherein a first output $(y_{1,1}(n))$ of the first recurrent neural network module is the only output of the PRNN predictor, while the first outputs of other recurrent neural network modules $(y_{i,1}(n), 2 \leq i \leq r)$ are all coupled with the recurrent neural network module of the next hierarchy, and the other N-1 outputs $(y_{i,2}(n) \sim y_{i,N}(n))$ of each recurrent neural network module are all fed back to the original recurrent neural network module, and the output $(y_{r,1}(n))$ of the last recurrent neural network module is also fed back to the last recurrent neural network module.

Figure 4:
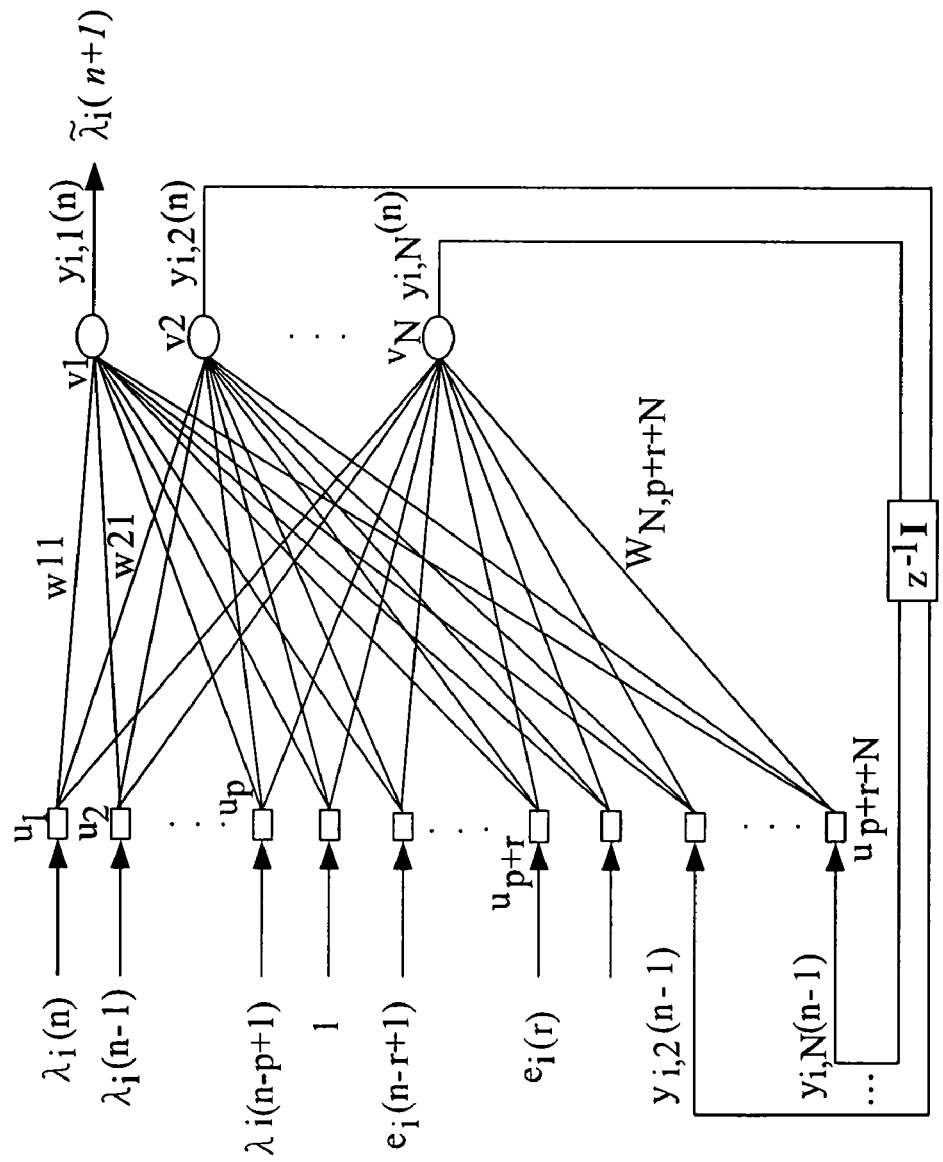
FIG. 4 illustrates a functional structure of recurrent neural network modules of the Ethernet passive optical network using the dynamic bandwidth allocation method.

Please refer to FIG. 4 for a functional structure of recurrent neural network modules of the Ethernet passive optical network using the dynamic bandwidth allocation method, wherein each recurrent neural network module comprises N neural cells $(v_1 \sim v_N)$, p external input ports, N feedback input ports and one bias input port; the external input port receives new packet transmission rate $\lambda_p(k), n-p+1 \leq k \leq n$, the N feedback input ports comprises N-1 self-feedback $(y_{i,2}(n) \sim y_{i,N}(n)$ in FIG. 4) outputs and the output $(y_{r,1}(n) \sim y_{2,1}(n)$ in FIG. 3) of the previous recurrent neural network module, the bias input value is set as 1. Since each recurrent neural network module is a sub-predictor of the r-hierarchy PRNN predictor, the sub-predictor would have a error value, which is defined as $e_i(n) = \lambda(n-i+1) - y_{i,1}(n), 1 \leq i \leq r$;

The error value is provided for updating a weight in each recurrent neural network module. The present invention uses an extended recursive least squares (ERLS) rule as the learning algorithm for the PRNN predictor to update the weight $w_{ij}$. Furthermore, in order to reduce the complexity of the predictor, all recurrent neural network module in the present invention are equipped with the same weighted array[W] (synaptic weight matrix), so the sum E(n) of errors for each sub-predictor must be obtained to adjust the weight, which is defined as:

$$E(n) = \sum_{i=1}^{r} \alpha_n^{i-1} * ei^2(n), \alpha_n \in (0,1],$$

and $\alpha_n$ is an exponential forgetting factor, which is between 0 and 1. Since the ERLS method uses the present and the previous (r-1) errors to make prediction, in order to achieve better results, the predicted value of new packet transmission rate $\tilde{\lambda}_{m,i}(n)$ in $T_i(n)$ time is used to estimate the number $\tilde{E}_{m,i}(n)$ of new packets in $T_i(n)$ cycle time, which is $\tilde{E}_{m,i}(n) = \tilde{\lambda}_{m,i}(n) \times T_i(n)$; however, the IPACT method cannot provide priority-based mechanism for the ONUs to meet the QoS demands, that is, the voice and video packets are more sensitive to network delays, and the data packets could have starvation problems for long waiting time.

Therefore, the present invention proposes a QoS-promoted Dynamic Bandwidth Allocation (PQ-DBA) method for maximizing the bandwidth utilization and for meeting QoS requirements, the method comprises:

The first is to determine priorities of client traffic types and quality of service (QoS) parameters, in the PQ-DBA method, the client traffic types are classified into six levels:

1) highest priority: a voice packet $Q_{0,i}$;
2) second priority: a video packet $L_{dp,i}$ facing a drop probability;
3) third priority: a video packet $L_{d,i}$ facing a delay problem;
4) fourth priority: a data packet $L_{w,i}$ facing a delay problem;
5) fifth priority: a common video packet $Q_{1,i}$; and
6) lowest priority: a common data packet $Q_{2,i}$.

Since the voice service and the video service are both real-time services and sensitive to delays, therefore the resent invention discloses three QoS to increase their traffic priorities:

1) video packet delay threshold ($T_d^*$): recorded in $L_{dp,i}$ to represent the number of unsent video packets to be dropped in the next cycle time (since the time delay of these packets are way beyond the threshold value $T_d^*$ at the end of the next cycle time);
2) video packet drop probability threshold ($P_d^*$): the tolerable video packet drop probability in maintaining video service quality, which is recorded in $L_{d,i}$ to represent the number of video packets needed to be sent out in the next cycle time for meeting the requirement of the drop probability $P_d^*$ (because the time delay of these packets are way beyond the threshold value $T_d^*$ at the end of the next cycle time, and a ratio $P_d^*$ of packets will be randomly dropped); however, the number of randomly dropped packets can't be too large to affect the QoS of video service.
3) data packet waiting time threshold ($T_w^*$): recorded in $L_{w,i}$ to represent the number of data packets exceeding the waiting time threshold ($T_w^*$) to avoid data packets exceeding the waiting time threshold and entering a starvation mode or even initiating a Random Early Drop (RED) mechanism.

The second step is to determine a bandwidth for each client traffic type, the PQ-DBA method will let the OLT 1 distribute all available bandwidth to $ONU_i$ from the highest priority to the lowest priority until all available bandwidth is used.

Figure 5:
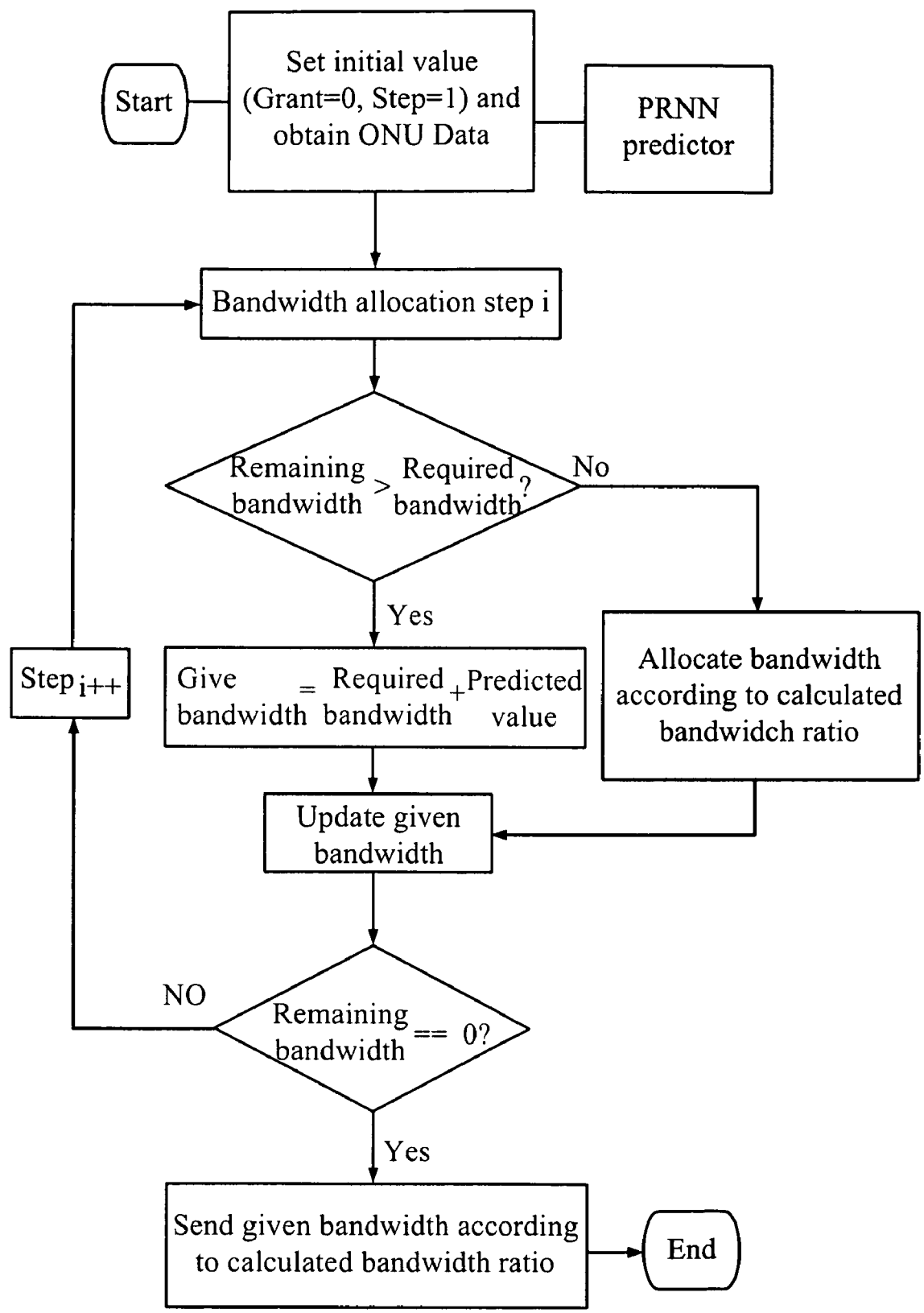
FIG. 5 illustrates a flowchart of a PQ-DBA method of the dynamic bandwidth allocation method used in the Ethernet passive optical network.

Please refer to FIG. 5 for a flowchart of a PQ-DBA method of the dynamic bandwidth allocation method used in the Ethernet passive optical network, wherein the ONU 3 (ONU$_i$, $1 \leq i \leq M$) transmits $L_{0,i}$, $L_{dp,i}$, $L_{d,i}$, $L_{w,i}$, $L_{1,i}$, $L_{2,i}$ and $1 \leq i \leq M$ to the OLT 1, and the OLT 1 receives the values of $L_{0,i}$, $L_{dp,i}$, $L_{d,i}$, $L_{w,i}$, $L_{1,i}$, $L_{2,i}$ in the REPORT MPCPDUs from the ONU$_i$, calculates them with the prediction values from the PRNN predictor and then sends the Grant MPCPDUs specifying the distributed bandwidth $G_{0,i}$, $G_{1,i}$ and $G_{2,i}$ to the ONUs 3 (ONU$_i$, $1 \leq i \leq M$), assuming the total bandwidth of each ONU$_i$ is B, the method comprises:

Step 1: distributing a voice bandwidth ($G'_{0,i}$) to the first priority traffic type according to a packet value $L_{0,i}$ stored in a queue by the ONU$_i$;

Step 2: distributing a video bandwidth ($G'_{1,i}$) to the second and third priority traffic types according to a remaining bandwidth $$B - \sum_{i=1}^{M} G'_{0,i}$$

from step 1 and packet values $L_{d,i}$ of the video packet facing a drop probability and the packet values $L_{dp,i}$ of the video packet facing a delay problem of the ONU$_i$;

Step 3: distributing a data bandwidth ($G'_{2,i}$) to the fourth priority traffic type according to a remaining bandwidth $$B - \sum_{i=1}^{M} [G'_{0,i} + G'_{1,i}]$$

from step 2 and a packet value $L_{w,i}$ of the data packet of the ONU$_i$;

Step 4: distributing a common video bandwidth ($G''_{1,i}$) to the fifth priority traffic type according to a remaining bandwidth $$B - \sum_{i=1}^{M} [G'_{0,i} + G'_{1,i} + G'_{2,i}]$$

from step3 and a remaining packet value $L_{1,i}$-$L_{d,i}$ of the common video packet queue $Q_{1,i}$ of the ONU$_i$;

Step 5: distributing a data bandwidth ($G''_{2,i}$) to the lowest priority traffic type according to a remaining bandwidth $$B - \sum_{i=1}^{M} [G'_{0,i} + G'_{1,i} + G'_{2,i} + G''_{1,i}]$$

from step4 and a remaining packet value $L_{2,i}$-$L_{w,i}$ of the common data packet queue $Q_{2,i}$ of the ONU$_i$;

Step 6: distributing remaining bandwidth, if there's still available bandwidth after all required bandwidth is distributed to the ONUs, that is $$B - \sum_{i=1}^{M} [G'_{0,i} + G'_{1,i} + G'_{2,i} + G''_{1,i} + G''_{2,i}] > 0,$$

then the remaining bandwidth is again distributed to the voice bandwidth ($G'''_{0,i}$) and video bandwidth ($G'''_{1,i}$) of the ONU$_i$ according to the ratio of packet values $L_{0,i}$ and $L_{1,i}$; and Step 7: sending GRANT MPCPDU (voice), wherein the distributed bandwidth $G_{0,i}$(voice), $G_{1,i}$(video), $G_{2,i}$(data) is the sum of the respective distributed value of the previous six steps.

$$\begin{cases} G_{0,i} = G'_{0,i} + G'''_{2,i}. \\ G_{1,i} = G'_{1,i} + G''_{1,i} + G'''_{1,i}. \\ G_{2,i} = G'_{2,i} + G''_{2,i}. \end{cases}$$

The present invention discloses a dynamic bandwidth allocation method of the Ethernet passive optical network, while compared with prior art techniques, is advantageous in:

1. The present invention can accurately predict traffic (arrived packets) for each service in one cycle time and provides a reference for the OLT to distribute bandwidth to each ONU.
2. The PRNN predictor is advantageous in providing fast convergence and accurate prediction; therefore it is suitable for making prediction of the Ethernet passive optical network, wherein each ONU uses a pig-tail mechanism for late-reported traffic type. Using the PRNN can obtain more accurate and closer-to-reality client behaviors and numbers of various kinds of packets to improve transmission performance between the OLT and the ONU, even improves the bandwidth utilization rate of the Ethernet passive optical network.
3. The present invention provides better QoS, because the PQ-DBA method can establish better traffic assurance based on priorities of packets of different traffic types, besides, the PQ-DBA method designs additional QoS parameters to assure the service quality of every service (including voice, video and data).
4. The present invention can dynamically upgrade client's traffic priority according to a video packet delay threshold ($T_d^*$), a video packet drop probability threshold ($P_d^*$) and a data packet waiting time threshold ($T_w^*$) and by promoting a low priority packet which must be sent out in the next cycle time to avoid being dropped to become a higher priority packet, so the packets of the same packet type from the ONU will be transmitted in advance to improve service quality.
5. The PRNN/ERLS predictor disclosed in the preset invention could solve the problem encountered by the TDMA and the IPACT method since there could be a two-to-three cycle time delay for data packets from the client (in the worst case).

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

REFERENCES

[1] G. Kramer, B. Mukherjee, and G. Pesavento, "Ethernet PON (EPON): design and analysis of an optical access network," Phontic Network Commun., vol. 3, no. 3, pp. 307-319, July 2001.
[2] G. Kramer et al., "IPACT: A dynamic protocol for an Ethernet PON (EPON)," IEEE Commun. Mag., vol. 40, no. 2, pp. 74-80, February 2002.

[3] H. Cheng, M. Chen, and S. Xie, "A dynamic bandwidth allocation scheme supporting different priority services in EPON," Proc. of SPIE, vol. 5626, pp. 1123-1127, 2005.

[4] C. M. Assi, Y Ye, S. Dixit, and M. A. Ali, "Dynamic bandwidth allocation for Quality-of-Service over Ehternet PONs," IEEE JSAC., vol. 21, pp. 1467-1477, November 2003.

[5] J. Xie, S. Jiang, and Y. Jiang, "A dynamic bandwidth allocation scheme for differented services in EPONs," IEEE Opt. Commun., vol. 42, pp. 32-39, August 2004.

[6] Y Yang, J. Nho, and B. Ahn, "An enhanced burst-polling based delta dynamic bandwidth allocation scheme for QoS over E-PONs," NRBC'04, vol. 89, pp. 31-36, October 2004.

[7] Y Luo and N. Ansari, "Bandwidth allocation for multiservice access on EPONs," IEEE Opt. Commun., vol. 43, pp. 16-21, February 2005.

[8] S. Haykin and L. Li, "Nonlinear adaptive prediction of nonstationary signals," IEEE Trans. Signal Processing, vol 43, pp. 526-535, 1995.

[9] J. Baltersee and J. A. Chambers, "Nonlinear adaptive prediction of speech using a pipelined recurrent neural network," IEEE Trans. Signal Process., vol. 46, no. 8, pp. 2207-2216, August 1998.

What is claimed is:

1. A dynamic bandwidth allocation method of an Ethernet passive optical network (EPON), comprising:
   1) predicting a client behavior and numbers of various kinds of packets by using a pipelined recurrent neural network and an extended recursive least squares (ERLS) rule;
   2) maximizing a bandwidth utilization rate of the EPON by using a QoS-promoted Dynamic Bandwidth Allocation method;
   wherein the Ethernet passive optical network comprises:
   a optical line terminal (OLT) coupling with a splitter for broadcasting downlink packets to a plurality of ONUs, the OLT further comprising a pipelined recurrent neural network (PRNN) for distributing a GRANT MultiPoint Control Protocol Data Unit (MPCPDU);
   the splitter coupling with the OLT and the plurality of ONUs, wherein the splitter is a one-to-multiple-point splitter;
   the plurality of ONUs coupling with the splitter and a plurality of clients, each ONU receiving its own packets according to a Logic Link Identifier (LLD) and dropping packets not matching with its LLD;
   the plurality of clients coupling with the plurality of ONUs, since the OLT and the plurality of ONUs communicate with each other by using GRANT and REPORT MPCPDUs, there could be a two-to-three-cycle-time delay during which the plurality of clients is still transmitting data.

2. The dynamic bandwidth allocation method of an Ethernet passive optical network as claimed in claim 1, wherein the ONU comprises a queue controller, a voice packet queue, a video packet queue, a data packet queue and a packet controller.

3. The dynamic bandwidth allocation method of an Ethernet passive optical network as claimed in claim 1, wherein the PRNN predictor comprises r hierarchies, each hierarchy comprises a recurrent neural network module and a comparator.

4. The dynamic bandwidth allocation method of an Ethernet passive optical network as claimed in claim 3, wherein a first output ($y_{1,1}(n)$) of the first recurrent neural network module is the only output of the PRNN predictor, while the first outputs of other recurrent neural network modules ($y_{i,1}(n)$, $2 \leq i \leq r$) are all coupled with the recurrent neural network module of the next hierarchy, and the other N-1 outputs ($y_{i,2}(n) \sim y_{i,N}(n)$) of each recurrent neural network module are all fed back to the original recurrent neural network module, and the output ($y_{r,1}(n)$) of the last recurrent neural network module is also fed back to the last recurrent neural network module.

5. The dynamic bandwidth allocation method of an Ethernet passive optical network as claimed in claim 3, wherein the recurrent neural network module comprises N neural cells ($v_1 \sim v_N$), p external input ports, N feedback input ports and one bias input port.

6. The dynamic bandwidth allocation method of an Ethernet passive optical network as claimed in claim 3, wherein the external input port receives new packet transmission rate $\lambda_p(k)$, $n-p+1 \leq k \leq n$ the N feedback input ports comprises N-1 self-feedback ($y_{i,2}(n) \sim y_{i,N}(n)$) outputs and the output($y_{r,1}(n) \sim y_{2,1}(n)$) of the previous recurrent neural network module, the bias input value is set as 1.

7. The dynamic bandwidth allocation method of an Ethernet passive optical network as claimed in claim 3, wherein the recurrent neural network modules are each disposed with the same weighted array for adjusting a weight of an error of the PRNN predictor.

8. The dynamic bandwidth allocation method of an Ethernet passive optical network as claimed in claim 1, wherein the ERLS rule is based on a present and previous r-1 errors to update a weight $w_{ij}$.

9. The dynamic bandwidth allocation method of an Ethernet passive optical network as claimed in claim 1, wherein the dynamic bandwidth allocation method comprising:
   1) determining priorities of client traffic types and quality of service (QoS) parameters; and
   2) determining a bandwidth for each client traffic type.

10. The dynamic bandwidth allocation method of an Ethernet passive optical network as claimed in claim 9, wherein the step of determining priorities of client traffic types comprises:
    1) highest priority: a voice packet $Q_{0,i}$;
    2) second priority: a video packet $L_{dp,i}$ facing a drop probability;
    3) third priority: a video packet $L_{d,i}$ facing a delay problem;
    4) fourth priority: a data packet $L_{w,i}$ facing a delay problem;
    5) fifth priority: a common video packet $Q_{1,i}$; and
    6) lowest priority: a common data packet $Q_{2,i}$.

11. The dynamic bandwidth allocation method of an Ethernet passive optical network as claimed in claim 9, wherein the step of determining quality of service (QoS) parameters comprises a video packet delay threshold, a video packet drop probability threshold and a data packet waiting time threshold.

12. The dynamic bandwidth allocation method of an Ethernet passive optical network as claimed in claim 9, wherein the step of determining a bandwidth for each client traffic type is implemented by the OLT distributing all available bandwidth from the highest priority to the lowest priority until all available bandwidth is used.

13. The dynamic bandwidth allocation method of an Ethernet passive optical network as claimed in claim 9, wherein the step of determining a bandwidth for each client traffic type comprises:
    1) Step 1: distributing a voice bandwidth $G'_{0,i}$ to the first priority traffic type according to a packet value $L_{0,i}$ stored in a queue by the ONU;
    2) Step 2: distributing a video bandwidth $G'_{1,i}$ to the second and third priority traffic types according to a remaining bandwidth from step 1 and packet values $L_{dp,i}$ of the video packet facing a drop probability and packet values $L_{d,i}$ of the video packet facing a delay problem;

3) Step 3: distributing a data bandwidth $G'_{2,i}$ to the fourth priority traffic type according to a remaining bandwidth from step 2 and a packet value $L_{w,i}$ of the data packet facing a delay problem;

4) Step 4: distributing a common video bandwidth $G''_{1,i}$ to the fifth priority traffic type according to a remaining bandwidth from step3 and a remaining packet value $L_{1,i} - L_{d,i}$ of the common video packet queue $Q_{1,i}$;

5) Step 5: distributing a data bandwidth $G''_{2,i}$ to the lowest priority traffic type according to a remaining bandwidth from step4 and a remaining packet value $L_{2,i} - L_{w,i}$ of the common data packet queue $Q_{2,i}$;

6) Step 6: distributing remaining bandwidth, if there's still available bandwidth after all required bandwidth is distributed to the ONUS, then the remaining bandwidth is again distributed to the voice bandwidth $G'''_{0,i}$ and video bandwidth $G'''_{1,i}$ according to the ratio of packet values $L_{0,i}$ and $L_{1,i}$; and 7) Step 7: sending GRANT MPCPDU, wherein the distributed bandwidth is the sum of the respective distributed value of the previous six steps.

14. The dynamic bandwidth allocation method of an Ethernet passive optical network as claimed in claim 13, wherein distributed bandwidth values $G_{0,i}$, $G_{1,i}$, and $G_{2,i}$ are the respective sums of the outcomes of the six steps in claim 14.

15. The dynamic bandwidth allocation method of an Ethernet passive optical network as claimed in claim 14, wherein $G_{0,i} = G'_{0,i} + G'''_{2,i}$.

16. The dynamic bandwidth allocation method of an Ethernet passive optical network as claimed in claim 14, wherein $G_{1,i} = G'_{1,i} + G''_{1,i} + G'''_{1,i}$.

17. The dynamic bandwidth allocation method of an Ethernet passive optical network as claimed in claim 14, wherein $G_{2,i} = G'_{2,i} + G''_{2,i}$.

* * * * *